Figure 1:
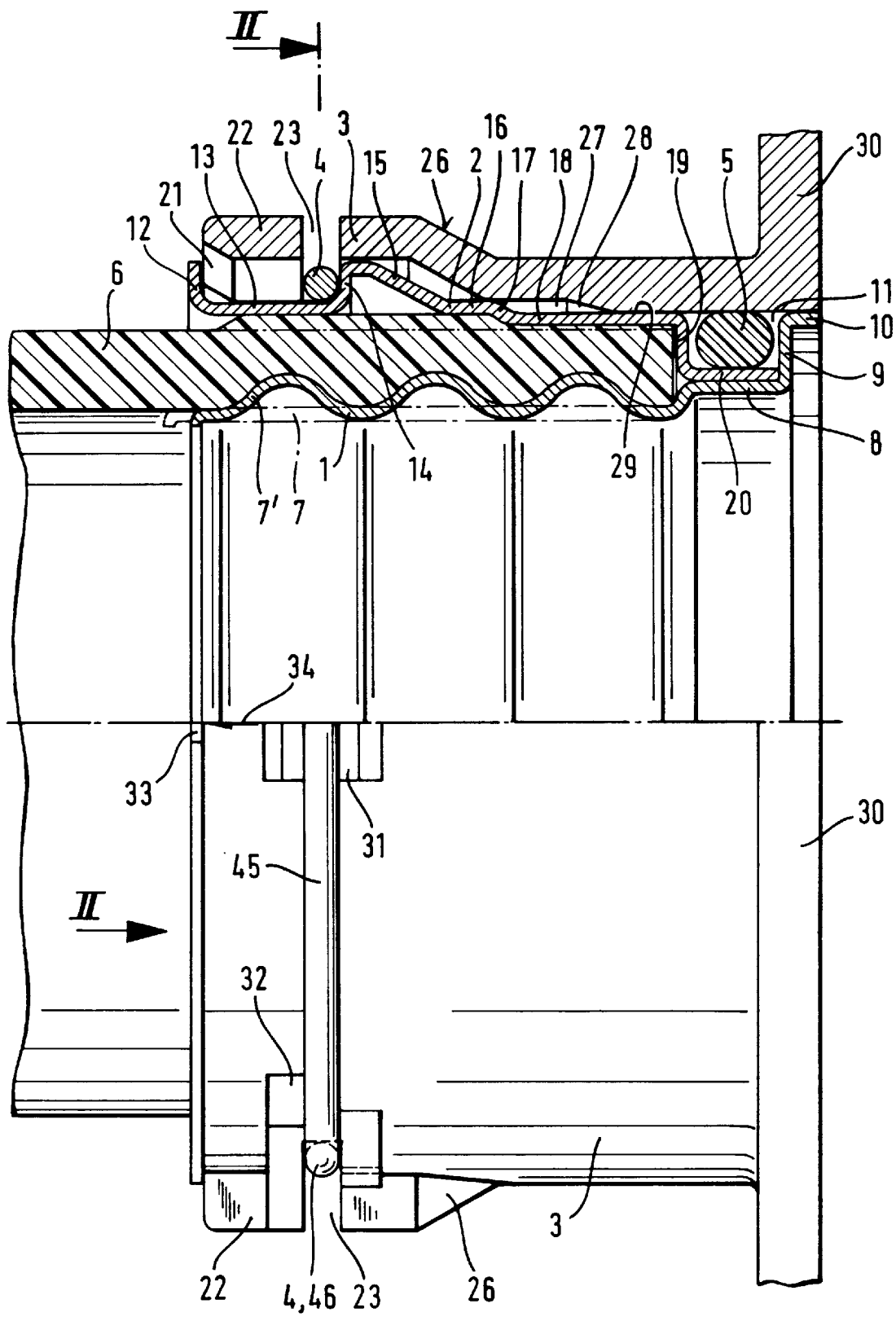

United States Patent [19]
Profunser

[11] Patent Number: 5,855,399
[45] Date of Patent: Jan. 5, 1999

[54] PLUG-IN CONNECTION FOR PIPELINES AND HOSES

[75] Inventor: Herbert Profunser, Muntlix, Austria

[73] Assignee: Dipl. Ing. Henn Ges.m.b.H. & Co. Kg, Austria

[21] Appl. No.: 659,108

[22] Filed: Jun. 21, 1996

[30] Foreign Application Priority Data

Jun. 22, 1995 [DE] Germany .............. 195 22 690.9

[51] Int. Cl.⁶ ............................................... F16L 37/08
[52] U.S. Cl. ................. 285/305; 285/307; 285/308; 285/371
[58] Field of Search .................. 285/305, 307, 285/308, 319, 321

[56] References Cited

U.S. PATENT DOCUMENTS

| | | | |
|---|---|---|---|
| 2,487,470 | 11/1949 | Osborn | 285/321 |
| 4,423,891 | 1/1984 | Menges | 285/305 |
| 4,575,133 | 3/1986 | Nattel | 285/319 |
| 4,640,534 | 2/1987 | Hoskins | 285/321 |
| 4,884,829 | 12/1989 | Funk et al. | 285/305 |
| 4,929,002 | 5/1990 | Sauer | 285/319 |
| 4,969,667 | 11/1990 | Sauer | 285/319 |
| 5,078,429 | 1/1992 | Braut et al. | 285/319 |
| 5,094,493 | 3/1992 | Sauer | 285/319 |
| 5,273,323 | 12/1993 | Calmettes et al. | 285/321 |

FOREIGN PATENT DOCUMENTS

| | | | |
|---|---|---|---|
| 0 393 303 | 10/1990 | European Pat. Off. . | |
| 2 667 922 | 4/1992 | France . | |
| 2 704 296 | 10/1994 | France . | |
| 76250 | 7/1894 | Germany | 285/321 |
| 58275 | 10/1967 | Germany | 285/305 |
| 3 729 570 | 3/1988 | Germany . | |
| 405033891 | 2/1993 | Japan | 285/305 |
| 804986 | 2/1981 | U.S.S.R. | 285/321 |
| 939356 | 10/1963 | United Kingdom | 285/305 |

*Primary Examiner*—Eric K. Nicholson
*Attorney, Agent, or Firm*—Gray Cary Ware & Freidenrich

[57] ABSTRACT

A plug-in connection is described for the joining of pipelines and hose lines, especially for use with the pipeline systems of motor vehicles, consisting of an inner sleeve and an outer sleeve, which accommodate a pipeline or hose line between them, so that a pipe socket can be placed on top of the outer sleeve, which can be locked by means of a protective element to the outer sleeve. The pipe socket has, on its outer circumference, at least one radial trapezoidal indentation oriented in the lengthwise direction. The pipe socket has an opening in the region of the indentation in the circumferential direction, through which a piece of the protective element reaches, and the indentation is matched up with a trapezoidal projection on the outer sleeve, with which the protective element interacts. The plug-in connection has at least one length-minimized, width-variable, integrated projection/opening arrangement on the outer sleeve and in the pipe socket with a detent spring for single-hand operation. The integrated projection/opening arrangement interacts with a detent projection captively arranged on the pipe socket in a relocate guide formed by the particular indentation, the detent projection being fashioned as a trapezoidal bead partly reaching through the particular opening.

11 Claims, 8 Drawing Sheets

PLUG-IN CONNECTION FOR PIPELINES AND HOSES

This invention generally concerns plug-in connections for joining tubes, and in particular, a plug-in connection for joining pipe and hose lines. A conventional plug-in connection is discussed in French patent FR 2 667 92. This conventional plug-in connection has an inner sleeve onto which the hose is fastened, as well as an outer sleeve that is fastened onto the outside of the hose, both sleeves being joined together approximately at their midpoints. This connection is secured by fitting a pipe socket over the outer sleeve. The pipe socket has a triangular detent spring to secure the plug-in connection between the outer sleeve and the pipe socket. The pipe socket has three slots uniformly arranged about its outer circumference and piercing its wall. These slots occupy around 50% of the circumferential length of this pipe socket.

This structure leads to the first disadvantage of conventional plug-in connections that to safeguard the necessary stability of the pipe socket only selected materials with corresponding wall thicknesses can be used.

The projections located on the outer sleeve are tabs cut out on three sides from the material of the outer sleeve and protruding outwardly, so that the necessary stability of these projections can only be assured by using selected materials having a corresponding material thickness.

Because of the already described three relatively large slots formed in the pipe socket, this pipe socket can be fitted onto the outer sleeve and locked in a total of three different angular positions. But in many instances this is undesirable, because a precise true positioning of the coupling elements is desired, which is not assured by the plug-in connection described in FR 2 667 922 A1.

Moreover, the triangular detent spring used in this plug-in connection is difficult to install and, most important, it is arranged on the pipe socket in a way such that it can be lost.

In order to open this coupling, it is necessary to separate the spring completely from the pipe socket, and in order to produce the locking connection the spring must then be separately mounted in tedious fashion, which is not possible in the close space of a vehicle installation.

The other plug-in connection to be taken into consideration, described in FR 27 04 296 A1, has essentially the same disadvantages as that already described in FR 2 667 922 A1. Once again, the length of the slots is disproportionately long and it is not possible to assemble the parts in only one rotary position without additional coupling means. In order to accomplish this, this plug-in connection provides its own coupling means, namely, a corresponding tab, which engages with a single mating recess on the inner sleeve. The detent spring in this plug-in connection can be lost just as easily as in the described FR 2 667 922 A1.

The plug-in connection described in FR 27 04 296 A1 has no projection at all, but instead it represents a circumferential index notch, and the spring then locks in the index notch by engaging the slots when assembled condition.

EP 0 393 303 A2 describes a plug-in connection without a spring assembly, but instead with a normal bayonet seal in which rotation of a corresponding outer sleeve is supposed to engage the bayonet recesses with corresponding projections on the opposite piece. Thus, the plug-in connection described in EP 0 393 303 A2 is not a locking connection, but rather a rotary coupling which works without springs.

Another plug-in connection is described in DE 37 29 570 A1, in which a detent spring, is already used as a locking means, which likewise engages with corresponding slots in the pipe socket. However, the detent spring itself cannot be seperately detached, but rather the entire connection is detachable by deformation of the pipe socket itself, so that the detent spring is also correspondingly opened, in order to disengage it in the region of the bearing edges of the outer sleeve. However, such a connection is not suitable in automotive design for the sealing of radiator hoses and the like, but only for relatively small-dimensioned ventilation lines and the like, where small diameters of the plug-in connection are sufficient and a corresponding deformation of the fitting parts is assured.

Consequently, the purpose of the application is to modify a plug-in connection, based on FR 26 67 922 A1, so that the connection even with relatively large diameters of the plug-in connection guarantees a great stability and operates with a specially configured detent spring, mounted in a way so that it cannot be lost on the pipe socket and is manually operable.

In order to accomplish this purpose, the invention is characterized by the pipe socket having a projection and a corresponding opening on its surface, a detent spring that can be operated manually and that cooperates with a detent projection formed as a bead on the pipe socket, such that the detent spring is captively arranged as a relocate guide that is formed by the indentation and the projection to reach though the opening on the surface of the pipe socket.

An essential feature of the invention is that the trapezoidal indentations in the outer sleeve and in the pipe socket are relatively short indentations on the pipe socket serve as a relocate guide for a captive arrangement of the pipe socket. This allows the detent spring to be operated with one hand.

Another essential feature of the invention is the configuration of the projection as a deep-drawn bead part, making the projection much more stable, so the outer sleeve can be configured with substantially smaller wall thickness and, moreover, it is even possible to use materials not thus far employed, such as aluminum.

Furthermore, it is important that the arrangement of the projections and indentations affords protection against twisting, whereby the pipe socket can only be securely fitted onto the outer sleeve and locked in a very definite rotary position, which assures a precise true positioning of the coupling means.

Also essential to the invention is that the width of the indentations, like the width of the projections, is variable, that is, a broad indentation with a corresponding projection is present at one side of the hose coupling, while a narrow indentation is configured in a corresponding narrow projection on the other side of the hose coupling.

This design guarantees that the coupling can only be put together and locked in a single angular position and, furthermore, that no additional coupling means are required.

In a preferred embodiment of the invention, the roughly U-shaped detent spring has a central round piece, which is basically adapted to the outer diameter of the pipe socket, but the diameter of the round piece is chosen somewhat smaller than the outer diameter of the pipe socket, in order to afford a spring-loaded pretension of the detent spring on the outer circumference of the pipe socket.

In this way, each corresponding leg of the detent sprint engages a corresponding slot in the pipe socket, where each slot is fashioned as a continuous slot in the pipe socket.

While it is sufficient to have a single slot piercing the wall of the pipe socket; but for sake of simplicity, we speak of two opposite slots, although the invention should not be confined to this.

Thus, the invention may have one or more slots, which pierce the wall of the pipe socket and which engage corresponding legs of the detent spring.

It is important that the detent spring be dimensioned relatively slight. This slight dimensioning of the detent spring is achieved by having the length of the slots piercing the wall of the pipe socket is short.

This is accomplished, according to another essential feature of the present invention, because the slots are not arranged immediately in the wall of the pipe socket itself, but rather in the region of trapezoidal indentations, extending radially outwards from the wall of the pipe socket, and the aforesaid slots are present in the region of these indentations.

This yields the major advantage that, as compared to the known slot lengths, the slot length according to the invention need be only 1/3 to 1/5 the length of the known slots and, therefore, due to the short-slot, the detent spring can be made small.

In the case of the much longer slots according to the state of the art, which pierce the walls of the pipe socket, the detent spring will only thrust against the front and back edges of the slot in the region of this slot. Between these points, the detent spring lies with a relatively large, unsupported cross section, so that a force applied in the axial direction on the unsupported length of the spring must be absorbed by a relatively large spring cross section, so that in order to avoid an unacceptable buckling of the detent spring and, thus, an unacceptable loosening of the detent connection.

This is accomplished in the present invention by having the slot extend radially outwards in the wall of the pipe socket, whereby the detent spring only engages the material thickness of the pipe socket in the region of this radially short indentation formed in the circumferential direction, and the corresponding supported length of the detent spring is also configured correspondingly short. This structure advantageously allows the detent spring cross section to be small, and accordingly one can also dimension it to be weak, without endangering the function of the detent connection.

This then yields the further advantage that the detent spring can now be operated without tools, by the hand alone, and it can be designed in very cost-favorable way.

Because the detent spring can be engaged and disengaged by the hand alone and without tool, it is preferable to keep the detent spring captured on the pipe socket. This feature has already been described above, and it is essentially achieved by having the spring lie with its round central segment under spring tension against the outer circumference of the pipe socket and, moreover, the straight legs of the spring are inserted into the corresponding slots in the area of the indentations of the pipe socket, which lie under spring force there. The ends of the spring projecting from the slots then lie against the outer circumference of the pipe socket and can be provided with corresponding handles, in order to activate the spring more easily.

Even when two opposite slots are provided on the outer circumference of the pipe socket, it is enough to shift the detent spring at one end in the corresponding circumferential direction of the pipe socket in order to assure a radial spreading and cause the spring legs engaging in the slots to become disengaged with the corresponding bearing edges at the outer sleeve.

Thus, an engagement of the detent spring at one end is sufficient to loosen the detent connection and, consequently, it is no longer necessary to completely remove the detent spring from the connection, which would make it possible to lose the spring.

In a another embodiment of the invention, moreover, corresponding locking cams are present on the outer surface of the pipe socket for the purpose of spreading open the spring in the circumferential direction of the pipe socket, to engage the actuated end of the spread-open spring can engage, in order to protect the spring against an unwanted back-deformation. That is, the spring is held by these locking cams in a spread open position, so that the connection can be opened and closed with one hand and no tools. The described detent spring need not be made of metal, it can also be fashioned as a plastic piece or a plastic clip.

In a further embodiment of the present invention, the detent spring does not consist of a metal spring, but instead consists of a plastic part, which is joined to the pipe socket as a single or compound piece. This plastic part, which shall be designated hereafter as a snap-in pin, can be joined to the outer circumference of the pipe socket as a separate part in another embodiment, however, it can also be joined to form a single piece with the pipe socket itself. In the described embodiment, a rotary plug-in coupling is used. In this type of connection, the two mating parts, namely, the outer sleeve and the pipe socket, are first fitted together in the region of corresponding form-fitting parts (projections and indentations) and then twisted relative to each other in the circumferential direction.

The above-described snap-in pin is used to secure this rotary connection, being arranged on the outer circumference of the pipe socket and extending by one edge through a corresponding slot (detent opening,) of the pipe socket toward the outer sleeve arranged underneath, against which it thrusts at a corresponding bearing, edge. This connection can also be manipulated by one hand and without tools and it has the same advantages and features as were described above with respects to the first embodiment. An additional advantage is that one can fashion the snap-in pin as part of the same material as the pipe socket, and thus save additional parts.

The object of the present invention results not only from the object of the individual patent claims, but also from the combination of the individual patent claims with each other.

All information and features disclosed in the documents, including the summary, and especially the spatial configuration depicted in the drawings, are claimed as essential to the invention, insofar as they are new, by themselves or in combination, with respect to the state of the art.

The invention shall now be explained more closely by means of drawings depicting several embodiments. The drawings and their description will reveal additional essential features and advantages of the invention.

Figure 2:
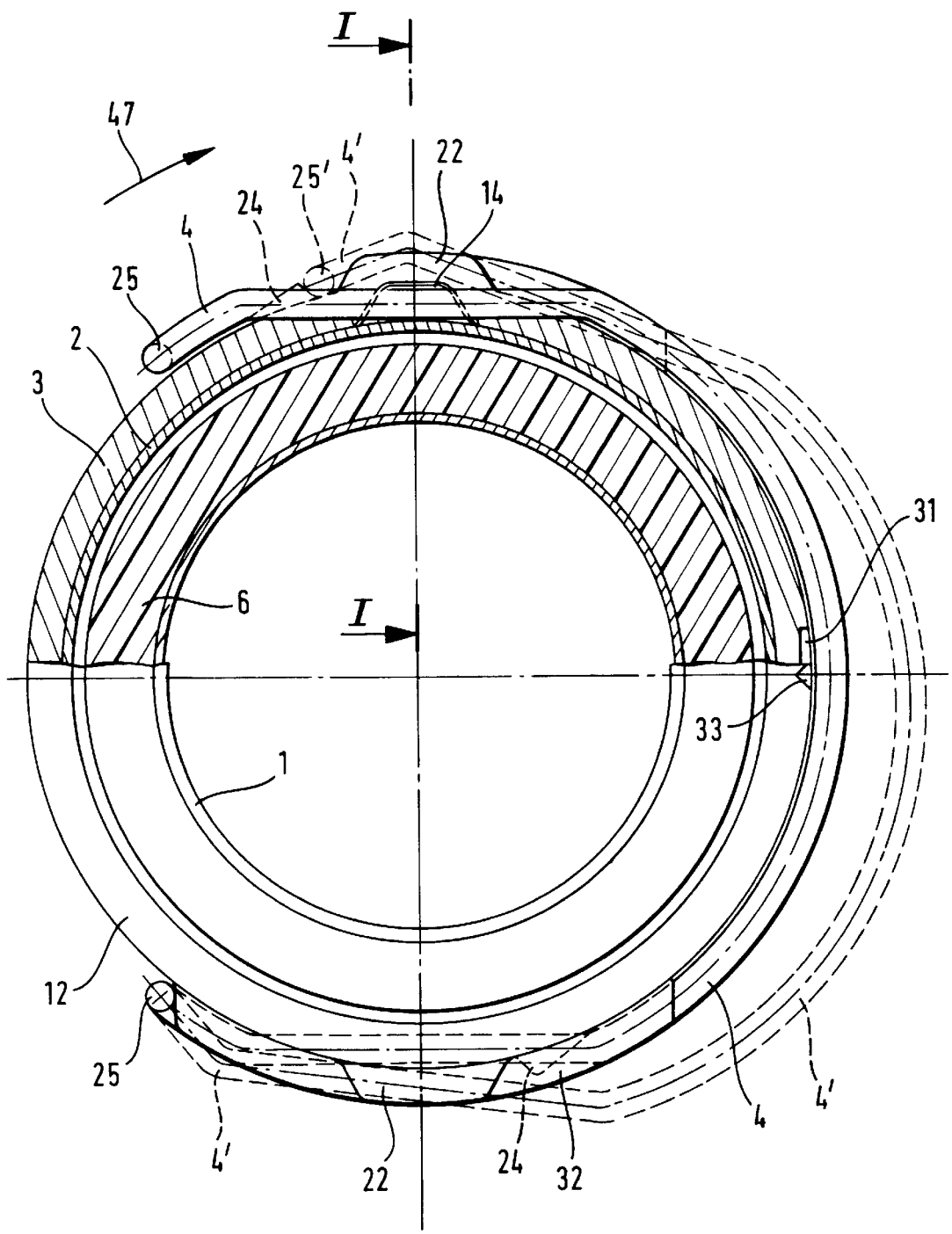
Figure 3:
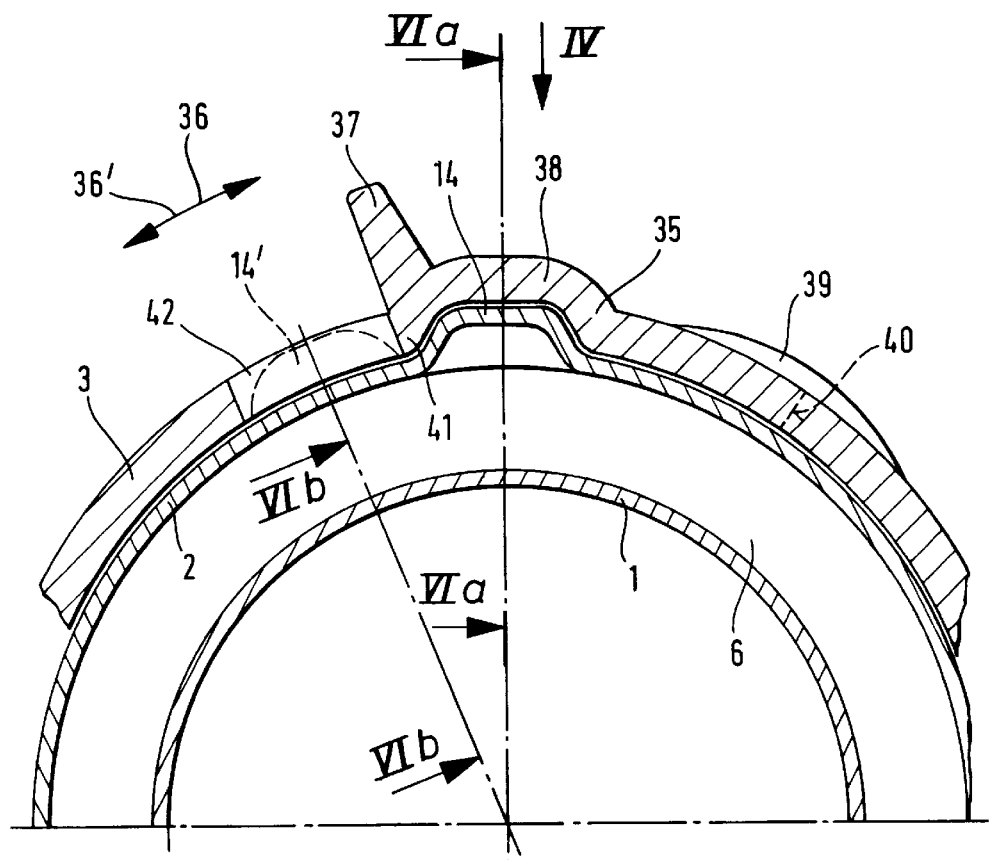
Figure 4:
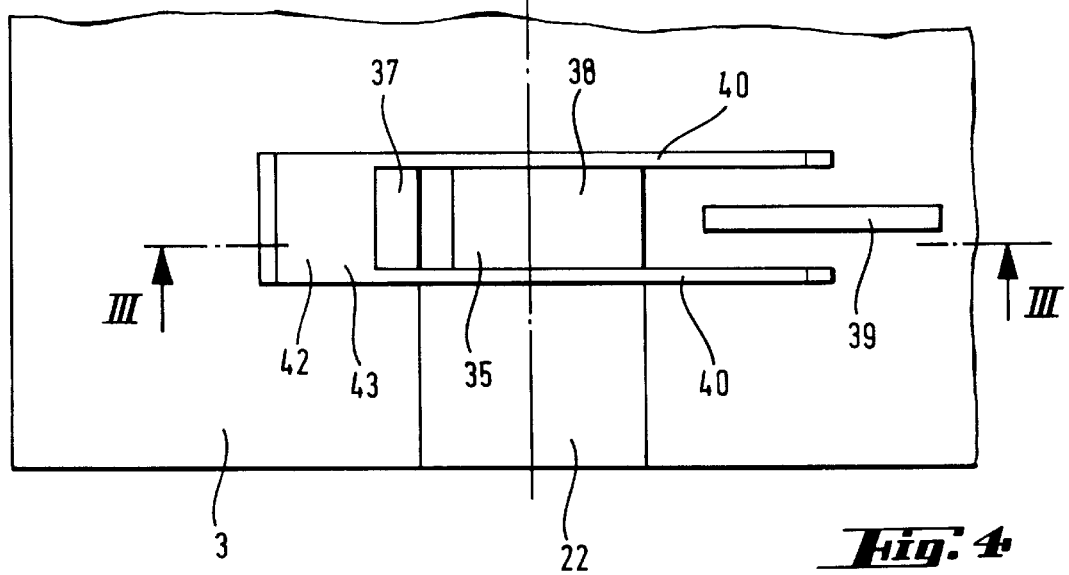
Figure 5:
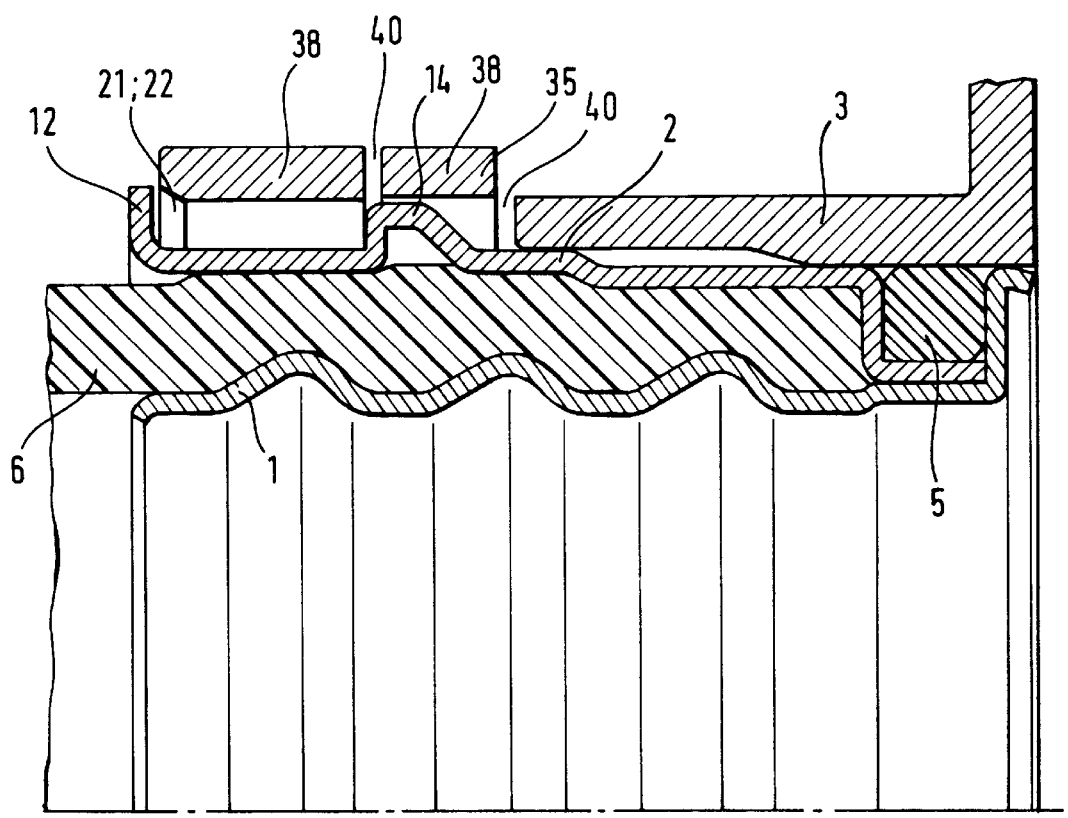
Figure 6A:
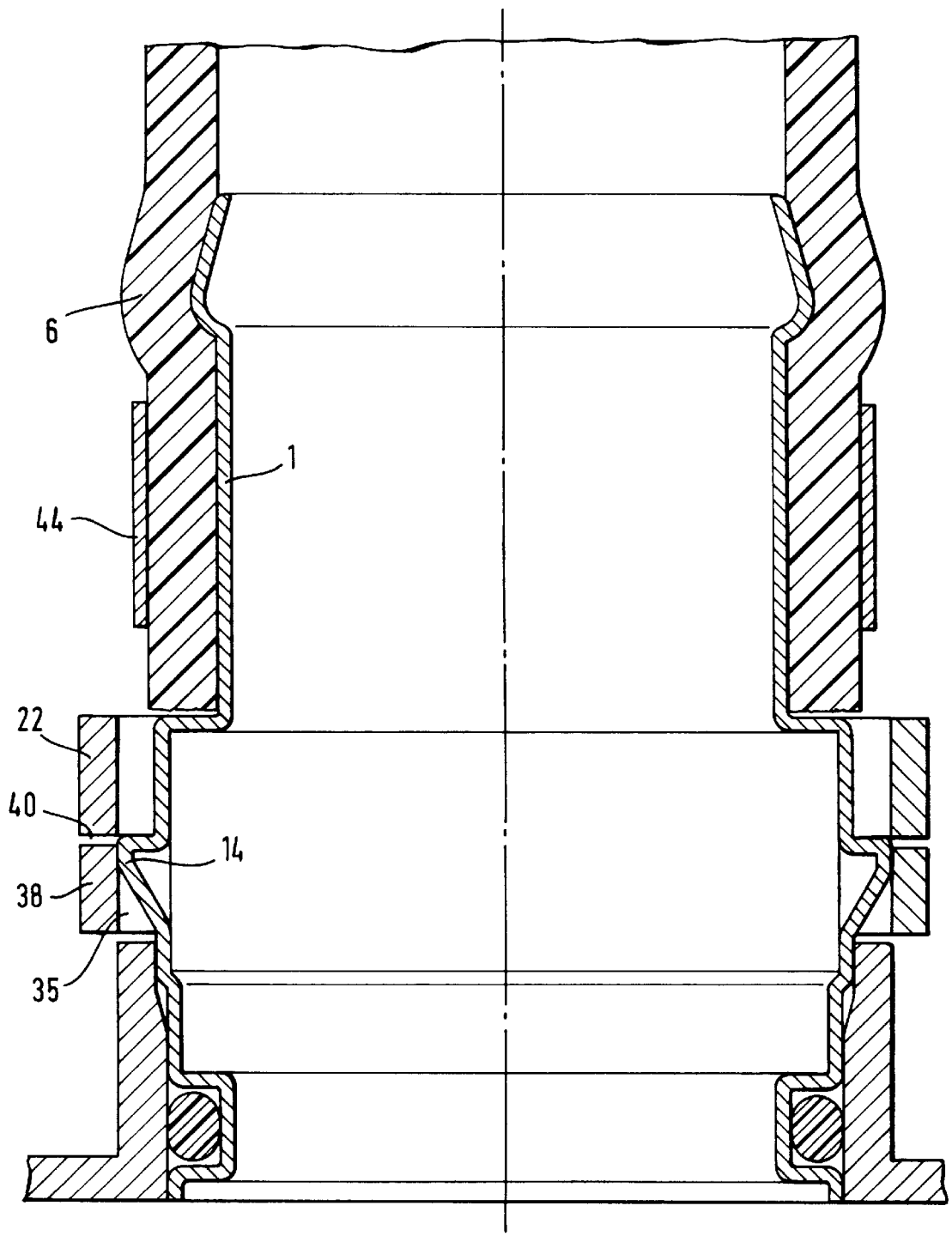
Figure 6B:
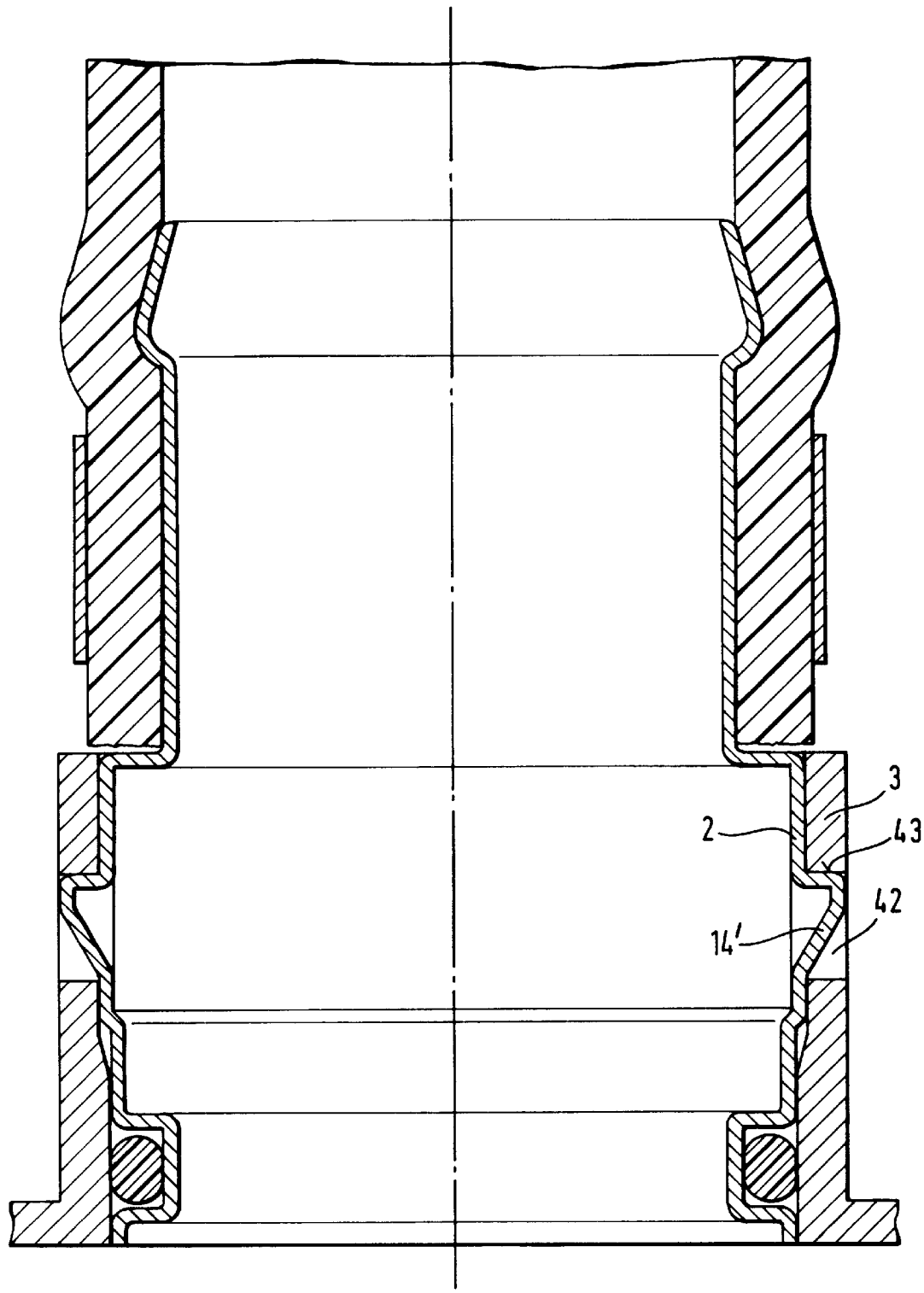
Figure 7:
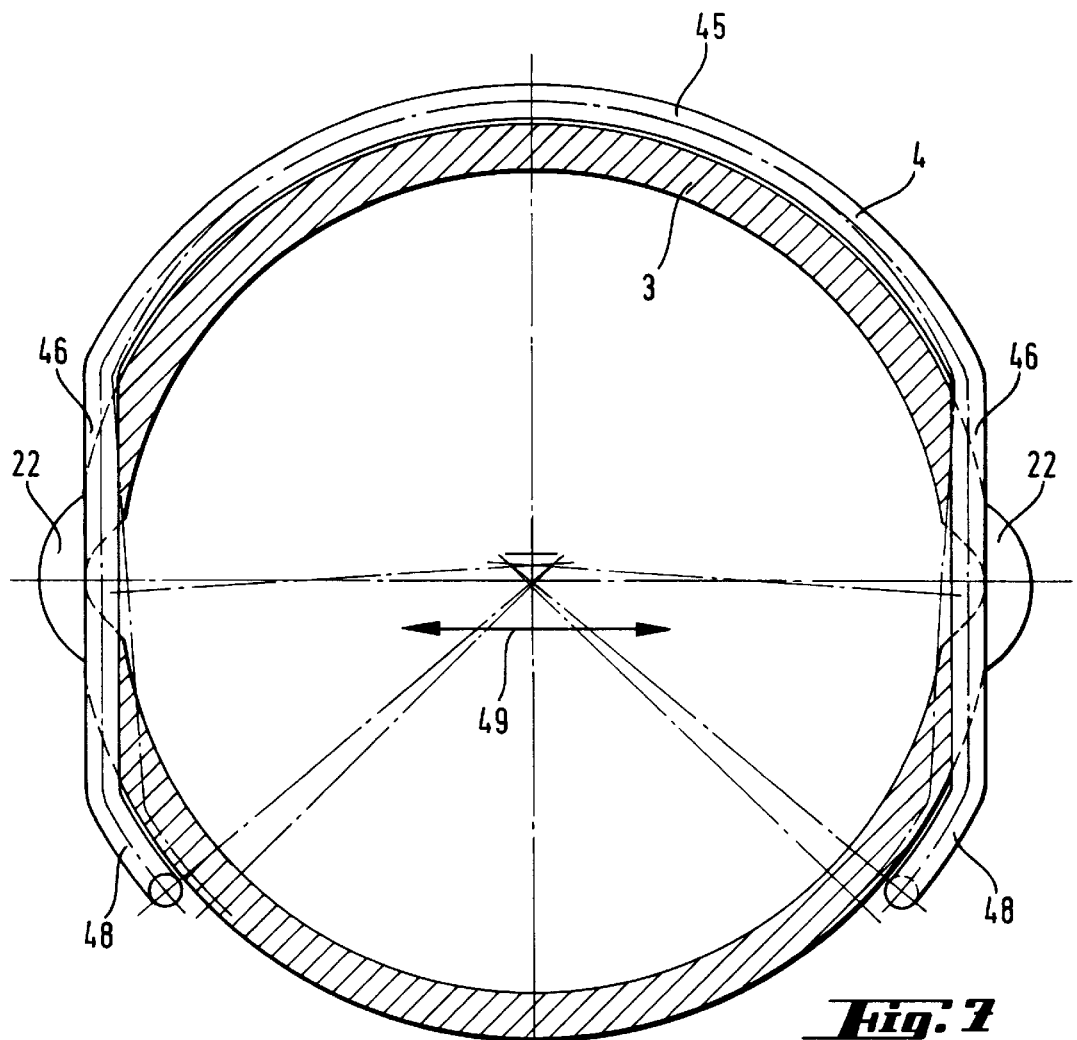
Figure 8:
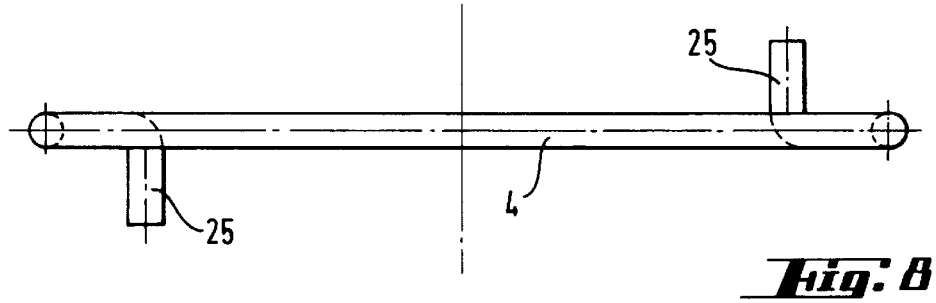

These show:

FIG. 1: Partial section through a connection in a first embodiment along the line I—I in FIG. 2;

FIG. 2: Partial section through the pipe connection of FIG. 1, made along line II—II in FIG. 1;

FIG. 3: Half section through a second embodiment of a plug-in connection according to the invention;

FIG. 4: Top view of the half-section in FIG. 3 along the arrow IV;

FIG. 5: Section along line VIa—VIa in FIG. 3;

FIG. 6a: Section along line VIa—VIa in FIG. 3 in a modified embodiment;

FIG. 6b: Section along line VIb—VIb in FIG. 3 through the modified sample embodiment;

FIG. 7: View of the detent spring for the plug-in connection according to FIGS. 1 and 2 in section, FIG. 8: Top view of the detent spring of FIG. 7, in the relaxed state, FIG. 9: Top view of a pipe socket without a detent spring arrangement, FIG. 10: Top view of a pipe socket with a detent spring in the detent or closed position, FIG. 11: Top view of a pipe socket with a detent spring in the released or open position.

According to FIGS. 1 and 2, the plug-in connection basically consists of an inner sleeve 1, an outer sleeve 2, and a pipe socket 3 placed over the outer sleeve 2. The inner sleeve 1 is inserted inside the hose 6 and preferably has at one end a continuous smooth wall 7, as depicted in FIG. 1 by broken lines. It is preferable to deform the wall 7 of the inner sleeve by a roll-pressing technique, so that continuous deformation grooves result, as shown by the reference numeral 7' in FIG. 1.

Based on this technique, the inner sleeve is expanded such that the flow cross section of the hose is also retained in the coupling region. The inner sleeve forms at its axial rear end a continuous, roughly horizontal flange 8, which passes into a radially directed flange 9, which in turn passes into an axially directed annular flange 10. In this way, the inner sleeve 1 forms, with the corresponding parts of the outer sleeve 2, an annular groove 11, in which a deformable sealing ring 5 is inserted. The outer sleeve 2 is securely fastened onto the outer circumference of the hose 6 and forms, at its axial rear end, a radially directed flange 19, serving as an end stop for the front edge of the hose 6. This flange 19 passes into an axially directed flange 20 and the two flanges 8, 20, lying one above the other, are joined together by a pressing technique. Instead of this technique, a welded connection or other familiar connection forms can also be used. The outer sleeve 2 forms, at its axial front end, a radially outward deflected stop 12 for the corresponding front edge of the pipe socket 3, which is placed on top of it. Next to this stop 12 is a horizontal, axially directed piece 13, which in turn passes into a radially directed projection 14. In this case, one or more projections 14 are distributed along the circumference of the outer sleeve 2. In the sample embodiment shown, two projections 14 are used for this.

The projection 14 passes into bevel 15 of the expanded diameter, which in turn passes into an axially directed segment 16 of the same diameter as part 13, which in turn passes via a shoulder 17 into another axial segment 18 of reduced diameter. Now, it is important in producing the detent connection that radially outward deflected indentations 22 from the wall of the pipe socket 3 are provided in the same number as the corresponding projections 14.

In the region of each indentation 22 there is arranged an opening 23, which pierces the thickness of the material of the wall of the pipe socket 3. In the region of this opening 23, the detent springs 4 engage corresponding spring legs (FIG. 7), each of which lies against the radially directed projection 14 of the outer sleeve 2. In this way, the plug-in connection is protected against axial separation and twisting.

In order to make the detent connection operate smoothly, the bevel 15 is provided to adjoin the projection 14 axially, so that the spring legs which slide off of this bevel 15 can be spread as easily as possible and then come to rest behind the projection 14. In order that the pipe socket 3 can be easily tightly fastened onto the outer sleeve 2, its front edge has a beveling 21.

In FIG. 2, the detent spring 4 is shown in two different states of deformation, namely in the detent position and in the open position. The open position is represented here by broken lines and the corresponding pails are indicated by a single stroke.

In order to manipulate the detent spring, it has spring-deflected spring ends 25 at its ends, while only a single spring end needs to be manipulated, for example, the upper spring end 25 in FIG. 2. If this spring end 25 is pushed by hand in the direction of the arrow 47, the detent spring 4 will be spread apart in its position 4' and, at the same time, the spring end reaches its position 25' and locks behind a locking cam 24, which is constructed on the envelope surface of the pipe socket 3 and directed radially outward, in order to protect the spring end 25 against being unintentionally pushed back opposite the direction of the arrow 47.

In addition, because the spring legs engage the respective opening 23 (see FIG. 1; of FIG. 7), the detent spring emerges from these openings 23, so that the projections 14 are released and the plug-in connection can be taken off without further equipment. It is important that, when the upper end 24 is manipulated, the lower spring end of the detent spring 4 (at the bottom in FIG. 2) concurrently moves out from the opening 23 and also releases the projection 14 at the bottom, without requiring a separate manipulation at the lower end of the spring 25. It is important that the lower spring end 25 remains in its position as indicated and act as a kind of pivot bearing, so that the detent spring remains at the outer circumference of the pipe socket 3 and is held captive there, by spring tension. In order to provide for the transition from the wall of the pipe socket of reduced diameter in the region of the indentations 22, this transition is formed by wedge surfaces 26 (FIG. 1).

Moreover, it can be seen from FIG. 1 that the outer sleeve 2 forms, in its front area, a sealing and guiding surface 29 between the corresponding outer circumference of the outer sleeve and the inner circumference of the pipe socket 3. Behind sealing and guiding surface in the axial direction there follows a bevel 28, which is worked into the inner circumference of the pipe socket 3, and in turn passes into a release point 27 on the inner circumference of the pipe socket 3. The pipe socket 3, moreover, can be put of a wall or another fixed element and directly joined to this wall 30 as a single piece of material.

Should it occur that the spring end 25 is not accessible for activating the detent spring 4, then a recess 31 is additionally provided on the outer circumference of the pipe socket 3, which can be engaged by a tool in an axial direction to spread the detent spring 4 in the region of its round part 45 with a screwdriver, for example, in order to loosen the detent connection.

In order to facilitate a properly oriented insertion of the outer sleeve 2 in the pipe socket 3, a corresponding marking 34 is arranged on the pipe socket 3. The notch 33 on the outer sleeve 2 is matched up with the marking 34. As lateral guidance for the spring and protection against axial shifting in the open state of the detent spring 4, one or more guides 32 are arranged on the outer circumference of the pipe socket 3; the guides lie laterally against the detent spring 4 in the area of the round piece 45. In addition, these guides 32 can be fabricated as stiffening points for the indentations 22 in the pipe socket 3.

The detent spring 4 or FIG. 7 consists of round piece 45, which lies under spring tension against the outer circumference of the pipe socket. Adjacent to the two end pieces of the round piece 45 are relatively straight and essentially parallel legs 46, which are suitable for engaging in the openings 23 on the pipe socket and which produce the detent connection. Next to these legs 46 are additional legs 48, somewhat bent in a circumferential direction, which protrude from the openings 23 of the pipe socket 3 and which also lie braced against the outer circumference of the pipe socket 3. The legs 48, in turn, are bounded by the aforementioned bent ends of the spring 25.

In FIGS. 3–6, another embodiment of the invention illustrates a rotary plug-in coupling. The safety feature of this rotary plug-in advantages as the pin 35, which has the same advantages as the previously described detent spring 4.

According to FIGS. 3–5, the detent plug-in connection basically consists of an inner sleeve 1 and an outer sleeve 2, which are joined together at their ends, as discussed above. Once again, a pipe socket 3 is used for the connection, on which the snap-in pin 35 is secured. The projections 14 are again arranged radially on the outer circumference of the outer sleeve 2 and interact with indentations 38 of the snap-in pin 35, while the indentations 38 in the snap-in pin described here are continued as corresponding indentations 22 along the pipe socket. If the insert piece with inner sleeve and outer sleeve 1, 2 is twisted in the direction of the arrow 36' (FIG. 3), then the snap-in pin 35 is lifted and the edge 41 of the snap-in pin 35 engages behind the projection 14, as is represented by broken lines in FIG. 3. Here, the outer sleeve 2 with projection 14' in the inserted and twisted condition is represented by broken lines while the outer sleeve 2 with projection 14 only inserted, but not twisted, is represented by solid lines. Thus, the locked position, not yet produced, is shown by solid lines. This rotary/plug-in connection is thus protected against twisting back to the open position (back-turning) by the engaging of the edge 41 behind the projection 14.

This rotary connection can be opened by grasping the handle 37 of the snap-in pin and lifting it in order to disengage the edge 41 from the projection 14. In order to improve the bending behavior of the snap-in pin, additional stiffening ribs 39 can be arranged on the snap-in pin 35, being preferably fashioned as one piece with the material of the pipe socket 3.

In order to make the snap-in pin 35 generally flexible, it is necessary to provide openings, fashioned as slots 40, running parallel to each other in the circumferential direction and defining between themselves the flexible snap-in pin 35. The slots lead to the detent opening 42, in which the snap-in pin 35 locks. To ensure that the snap-in pin is not pulled out axially, the projection 14 of the outer sleeve rests against the supporting edge 43 of the pipe socket 3 and secures the entire plug-in connection.

FIGS. 6a, 6b show, as an extension of the just-described sample embodiment, that the outer sleeve 2 need not necessarily have the configuration depicted in FIGS. 3–5, but instead it can be modified as in FIGS. 6a, 6b. Here, it can be seen that the inner sleeve 1 is also substantially eliminated and the previously described outer sleeve serves as both outer sleeve and inner sleeve. This structure is shown in the upper part of FIGS. 6a, 6b, where the outer sleeve 2 is so much diminished in diameter that the hose 6 can be securely fitted onto it, and this then acts as the inner sleeve. However, the two parts 1, 2 are joined together as a single piece of material, while it can be seen that the outer sleeve 2 forms the projections 14 in the manner described above, which interact with the snap-in pin 35, described above. FIG. 6a further shows a crimp ring 44 for fastening the hose to the inner sleeve. Preferably, only a single snap-in pin 35 arranged on the pipe socket 3 is used.

Figure 9:
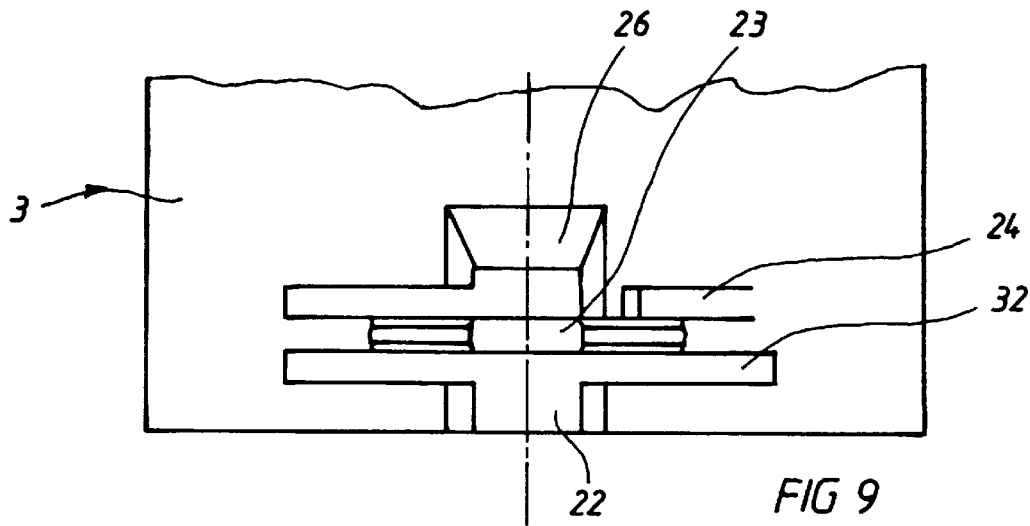
Figure 10:
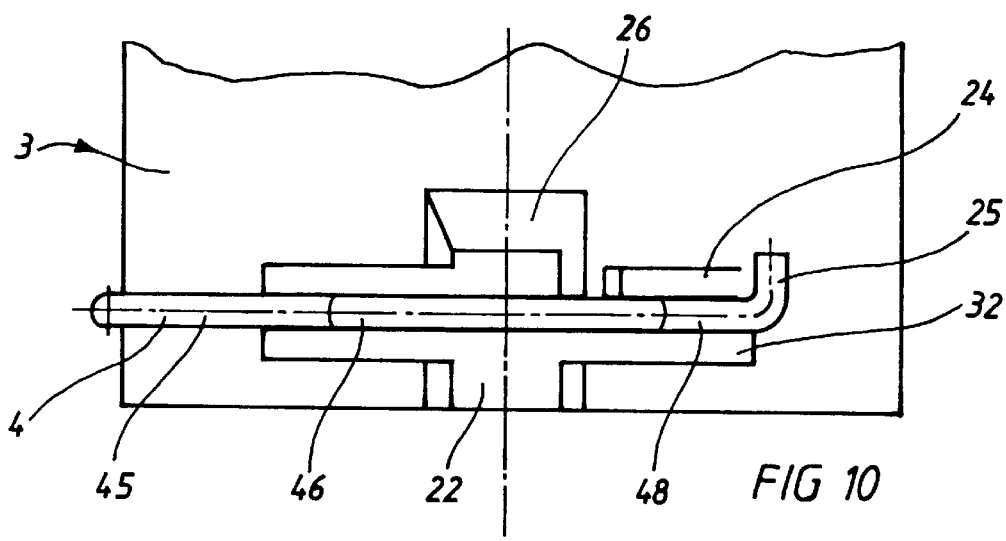
Figure 11:
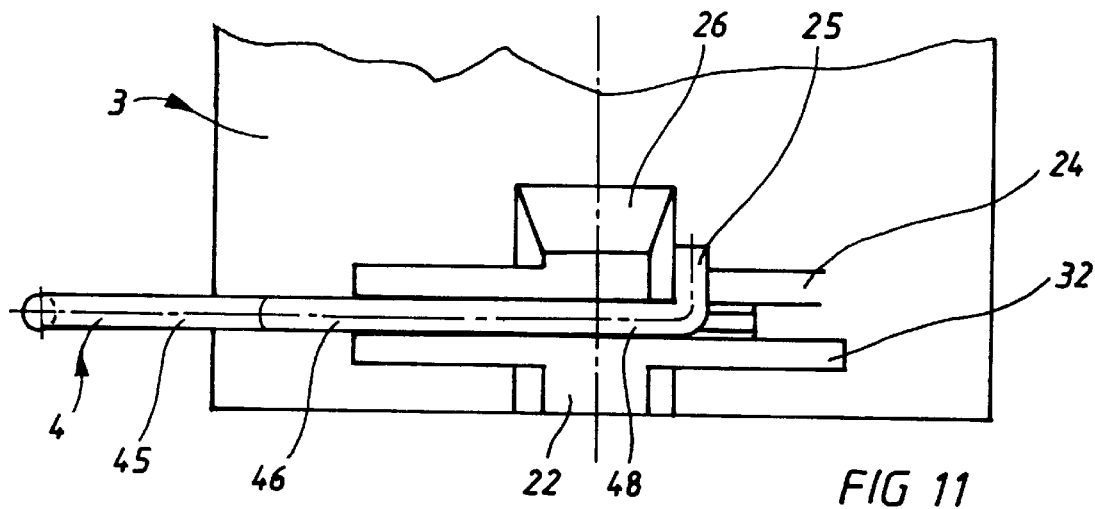

The configuration of the pipe socket 3 with or without the detent spring arrangement 4 for single-hand operation can be seen in FIGS. 9–11. The configuration of the pipe socket 3 with the indentation 22, the opening 23, the locking cam 24, the wedge surface 26, and the guide 32, is shown in FIG. 9.

FIG. 10 illustrates the arrangement of the detent spring 4 on the pipe socket 3 in the locked position. It can be seen that the upper spring-deflected spring end 25 is locked behind the locking cam 24 and the envelope surface of the pipe socket 3, so that an unintentional movement of the detent spring 4 back into the open position is not possible.

In FIG. 11, on the other hand, the arrangement of the detent spring 4 on the pipe socket 3 is shown schematically in the open position, the upper spring end 25 being detained between the locking cam 24 and the trapezoidal indentation 22 of the pipe socket 3. The position of the detent spring 4 can be changed from the detent to the release position on the pipe socket 3 by means of a single-hand pressure in the direction of the arrow 47 (FIG. 2) against the upper spring end 25 of the detent spring 4, and in the same way the position of the detent spring 4 can be changed from the release position to the detent position on the pipe socket 3 by single-hand pressure on the round piece 45 of the detent spring 4 in the direction of the envelope surface of the pipe socket 3.

I claim:

1. A connection for connecting a generally cylindrical hose to a pipe, the hose having an outer surface and an inner surface defining a bore, the connection comprising:

an inner sleeve sized to fit within the bore and to engage the inner surface;

an outer sleeve sized to be placed about the outer surface of the hose and to engage the outer surface of the hose, the outer sleeve having a radially projecting detent projection that forms a stop surface;

a pipe socket sized to be placed about the outer sleeve and having a circumferential slot formed in the pipe socket adjacent to the radially-projecting detent projection; and a generally U-shaped detent spring having a leg with a straight central portion and an end at an angle to the straight central portion which is connected to a curved portion, the curved portion engaging an outer surface of the pipe socket with the central portion of the leg disposed within the slot and engaging the stop surface of the detent projection and a side of the slot to attach the pipe socket to the outer sleeve and with the end of the leg being positioned outside of the slot and adjacent to the outer surface of the pipe socket, the detent spring is adapted to fit within a groove on the outer surface of the pipe socket, wherein the groove has guide ridges laterally displaced along the length of the surface of the pipe socket from the opening and serving as a stop for the end of the spring.

2. The connection of claim 1, wherein an inner diameter of the U-shaped portion is smaller than an outer diameter of the pipe socket.

3. The connection of claim 1, wherein the projection has a trapezoidally shaped bevel extending along the length of the outer sleeve.

4. A connection for connecting a generally cylindrical hose to a pipe, the hose having an outer surface and an inner surface defining a bore, the connection comprising:

an inner sleeve sized to fit within the bore and to engage the inner surface;

an outer sleeve sized to be placed about the outer surface of the hose and to engage the outer surface of the hose, the outer sleeve having a radially projecting detent projection that forms a stop surface;

a pipe socket sized to be placed about the outer sleeve and having a circumferential slot formed in the pipe socket adjacent to the radially-projecting detent projection; and a snap-in pin having an inner surface, the inner surface having an indentation disposed within the slot and matched to the contour of the detent projection to engage the stop surface and a side of the slot in order to attach the outer sleeve to the pipe socket, the snap-in pin having a radially projecting handle.

5. The connection of claim 4, wherein the outer sleeve and pipe socket are positioned with respect to the other about a central axis of the bore so that the stop surface is disengaged from the snap-in pin and fixed in a corresponding slot in the pipe socket.

6. The connection of claim 4, wherein a diameter of the inner sleeve is enlarged after accommodating the hose when the hose is secured between the outer sleeve and the inner sleeve.

7. The connection of claim 4, wherein the inner sleeve and the outer sleeve are fabricated from a single piece.

8. The connection of claim 4, wherein the outer sleeve and the pipe socket each have a corresponding marking for orienting the outer sleeve with the pipe socket.

9. A connection for connecting a generally cylindrical hose to a pipe, the hose having an outer surface and an inner surface defining a bore, the connection comprising:

an inner sleeve sized to fit within the bore and to engage the inner surface;

an outer sleeve sized to be placed about the outer surface of the hose and to engage the outer surface of the hose, the outer sleeve having a radially projecting detent projection that forms a stop surface;

a pipe socket sized to be placed about the outer sleeve and having a circumferential slot formed in the pipe socket adjacent to the radially-projecting detent projection;

a generally U-shaped detent spring having a leg with a central portion and an end connected to a curved portion, the curved portion engaging an outer surface of the pipe socket with the central portion of the leg disposed within the slot and engaging the stop surface of the detent projection and a side of the slot to attach the pipe socket to the outer sleeve and with the end of the leg being positioned outside of the slot and adjacent to the outer surface of the pipe socket; and the pipe socket has a locking cam on the outer surface, the cam engaging the spring end when the spring end is in a release position to maintain the spring end in the release position.

10. A connection for connecting a generally cylindrical hose to a pipe, the hose having an outer surface and an inner surface defining a bore, the connection comprising:

an inner sleeve sized to fit within the bore and to engage the inner surface;

an outer sleeve sized to be placed about the outer surface of the hose and to engage the outer surface of the hose, the outer sleeve having a radially projecting detent projection that forms a stop surface;

a pipe socket sized to be placed about the outer sleeve and having a circumferential slot formed in the pipe socket adjacent to the radially-projecting detent projection;

a generally U-shaped detent spring having a leg with a central portion and an end connected to a curved portion, the curved portion engaging an outer surface of the pipe socket with the central portion of the leg disposed within the slot and engaging the stop surface of the detent projection and a side of the slot to attach the pipe socket to the outer sleeve and with the end of the leg being positioned outside of the slot and adjacent to the outer surface of the pipe socket; and wherein the pipe socket has a longitudinally-extending recess having a sidewall and a floor adapted to accommodate the detent spring, the sidewall being spaced to provide a gap between the detent spring and the sidewall.

11. A connection for connecting a generally cylindrical hose to a pipe, the hose having an outer surface and an inner surface defining a bore, the connection comprising:

an inner sleeve sized to fit within the bore and to engage the inner surface;

an outer sleeve sized to be placed about the outer surface of the hose and to engage the outer surface of the hose, the outer sleeve having a radially projecting detent projection that forms a stop surface;

a pipe socket sized to be placed about the outer sleeve and having a circumferential slot formed in the pipe socket adjacent to the radially-projecting detent projection; and a snap-in pin having an inner surface, the inner surface having an indentation disposed within the slot and matched to the contour of the detent projection to engage the stop surface and a side of the slot in order to attach the outer sleeve to the pipe socket, the snap-in pin having a stiffening rib extending circumferentially along an outer surface of the snap-in pin.

* * * * *